US012629982B2

(12) United States Patent
Van Der Goes

(10) Patent No.: US 12,629,982 B2
(45) Date of Patent: May 19, 2026

(54) HEAT EXCHANGE SYSTEM, HVAC-SYSTEM AND VEHICLE

(71) Applicant: Lightyear IPCo B.V., Helmond (NL)

(72) Inventor: Kjell Van Der Goes, Heeze (NL)

(73) Assignee: Lightyear IPCo B.V., Helmond (NL)

( * ) Notice: Subject to any disclaimer, the term of this patent is extended or adjusted under 35 U.S.C. 154(b) by 333 days.

(21) Appl. No.: 18/266,649

(22) PCT Filed: Dec. 14, 2021

(86) PCT No.: PCT/EP2021/085664
§ 371 (c)(1),
(2) Date: Jun. 12, 2023

(87) PCT Pub. No.: WO2022/129031
PCT Pub. Date: Jun. 23, 2022

(65) Prior Publication Data
US 2024/0051368 A1 Feb. 15, 2024

(30) Foreign Application Priority Data
Dec. 14, 2020 (NL) ..................................... 2027099

(51) Int. Cl.
B60H 1/00 (2006.01)
(52) U.S. Cl.
CPC ..... B60H 1/00671 (2013.01); B60H 1/00035 (2013.01)
(58) Field of Classification Search
CPC ............ B60H 1/00035; B60H 1/00528; B60H 2001/00092
See application file for complete search history.

(56) References Cited

U.S. PATENT DOCUMENTS

| | | | | |
|---|---|---|---|---|
| 3,374,831 A | * | 3/1968 | Sieverding | F04D 29/441 165/122 |
| 4,712,611 A | * | 12/1987 | Witzel | B60H 1/00471 165/DIG. 309 |
| 5,165,452 A | * | 11/1992 | Cheng | G01M 9/04 138/37 |
| 2009/0239463 A1 | | 9/2009 | Goenka | |
| 2018/0043750 A1 | | 2/2018 | Won et al. | |

FOREIGN PATENT DOCUMENTS

FR 3016027 A1 7/2015

OTHER PUBLICATIONS

Netherlands Search Report dated Aug. 30, 2021, for Netherlands Patent Application No. 2027099.
PCT International Search Report and Written Opinion dated Jul. 4, 2022, for International Application No. PCT/EP2021/085664.

* cited by examiner

*Primary Examiner* — Allen R. B. Schult
(74) *Attorney, Agent, or Firm* — Patterson + Sheridan, LLP

(57) ABSTRACT

There is provided a heat exchange system that comprises a heat exchanger, a duct and a diverging element. The duct is adapted to guide an airflow to the heat exchanger. The diverging element is arranged in the duct. The diverging element is adapted to split the airflow into a first airflow part along a first flow path and a second airflow part along a second flow path. The diverging element is adapted to diverge at least one of the first airflow part and the second airflow part. The second flow path encloses the first flow path. Further, there is provided a HVAC-system for a vehicle comprising the heat exchange system. Yet further, there is provided a vehicle comprising the heat exchange system.

13 Claims, 4 Drawing Sheets

HEAT EXCHANGE SYSTEM, HVAC-SYSTEM AND VEHICLE

The invention relates to a heat exchange system, a Heating, Ventilation and Air-conditioning (HVAC-) system and a vehicle comprising the heat exchange system.

The project leading to this application has received funding from the European Union's Horizon 2020 research and innovation program under grant agreement No. 848620.

In several types of heat exchange systems, an airflow enters an inlet of the heat exchange system and exits the heat exchange system at an outlet of the heat exchanger. The airflow has a different temperature at the inlet than at the outlet. A heat exchanger is arranged in the heat exchange system. In the flow path from the inlet to the outlet, the airflow passes the heat exchanger. The heat exchanger exchanges heat with the airflow and thereby heats or cools the airflow. The heat exchanger thus changes the temperature of the airflow. The airflow then exits the heat exchanger at the outlet.

Known heat exchange systems are for example used in vehicles. Air from outside the vehicle is sucked into the inlet of the heat exchange system. The heat exchanger transfers heat from the engine of the vehicle to the airflow passing through the heat exchanger. As a result, the air is heated. The heated air exits the outlet of the heat exchange system to enter the cabin. This way, the heated air heats the cabin.

The heat exchanger has a receiving area to receive the airflow. At the receiving area, the heat exchanger is in contact with the airflow to transfer heat between the heat exchanger and the airflow. To maximize the heat exchange between the heat exchanger and the airflow, the receiving area is as large as possible.

Due to volume constraints, the inlet may have a smaller cross-section than the receiving area. To distribute the airflow over the receiving area, the cross-section of the duct between the inlet and the heat exchanger increases along the flow direction. A known heat exchange system is disclosed in U.S. Pat. No. 2,704,205, which uses a truncated conical member in the duct between the inlet and the heat exchanger. The conical member has a small cross-section near the inlet and a large cross-section near the heat exchanger. The airflow flows through the conical member to the receiving area of the heat exchanger.

A problem with the known heat exchange system is that the heat is not efficiently transferred between the airflow and the heat exchanger.

A known heat exchange system is disclosed in U.S. Pat. No. 4,712,611, disclosing a ventilation unit having a blower and a heat exchanger. A diffuser is positioned in the flow of air from the blower. The diffuser spreads the air flow so that is substantially covers the heat exchanger are.

Another known heat exchange system is disclosed in patent application US2009/0239463A1, which discloses a diffuser formed in a control module for a heating, ventilation, and air conditioning system. The diffuser includes an air distribution apparatus for minimizing a separation of a fluid flow therethrough.

Another known heat exchange system is disclosed in patent application FR3016027A1, which discloses a heat exchanger comprising a gas pipe. The gas pipe has a divergent element, which has a gas inlet and a gas outlet. A heat exchanger element is arranged at the gas outlet of the divergent element.

It is an objective of the invention to provide a heat exchange system with an improved efficiency, or at least an alternative for the prior art.

The objective is achieved by a heat exchange system comprising a heat exchanger, a duct and a diverging element. The duct is adapted to guide an airflow to the heat exchanger. The diverging element is arranged in the duct. The diverging element is adapted to split the airflow into a first airflow part along a first flow path and a second airflow part along a second flow path. The diverging element is adapted to diverge at least one of the first airflow part and the second airflow part. The second flow path encloses the first flow path.

By splitting the airflow into the first airflow part and the second airflow part, and then by diverging at least one of the first airflow part and the second airflow part, the diverging element is able to distribute the airflow over a cross-section in the duct. The airflow is distributed over a transverse plane, which is a plane that is perpendicular to the flow direction of the airflow. For example, the transverse plane is defined by the height and the width of the duct. The airflow is distributed along the height of the duct and/or along the width of the duct. By distributing the airflow in the transverse plane, the flow profile of the airflow becomes more uniform, i.e., differences in flow speeds along the flow profile of the airflow are reduced. By distributing the airflow in the transverse direction, the resulting airflow is divided more evenly over the receiving area of heat exchanger. In an example, the airflow has a high speed in the center of the transverse plane and a low speed at the edges of the transverse plane. When using the known heat exchange system, the heat exchanger would receive most air at the center of the receiving area and only little air at the sides of the receiving area. In the invention, the airflow reaches the diverging element where the airflow is split in a first airflow and a second airflow. In this example, the diverging element directs most air to the second airflow. As a result, the flow rate of the airflow near the edges of the duct is increased, while the flow rate of airflow at the center of the duct is decreased. The flow rate of the airflow is the volume of air that passes per unit of time, for example liters per second. By further diverging the first airflow part and/or the second airflow part, the resulting airflow is divided substantially more evenly along the transverse plane. In another example, a sharp bend in the duct between the inlet and the diverging element causes that the airflow has a high speed near an edge of the duct and a low speed at the center of the duct when the airflow reaches the diverging element. The diverging element splits the airflow into the first airflow part along the first flow path and the second airflow part along the second flow path. The diverging element forms a large opening in the center of the duct to provide the first flow path. The diverging element forms a small opening near the edge of the duct to provide the second flow path. Because of the large opening in the center of the duct and the small opening near the edge of the duct, the flowrate of airflow near the center is increased while the flowrate of airflow near the edge is decreased. By further diverging the first airflow part and/or the second airflow part, the resulting airflow is divided more evenly over receiving area of the heat exchanger. By more evenly dividing the resulting airflow over the receiving area of the heat exchanger, the heat exchanger is able to efficiently exchange heat with the resulting airflow.

The heat exchanger is for example a heating unit. The heating unit is adapted to transfer heat from the heating unit to the airflow to increase the temperature of the airflow. The heating unit, for example, comprises a conduit arranged to provide a flow of liquid and/or gas through the heating unit. The conduit is, for example, coupled to a boiler adapted to heat the liquid and/or gas in the conduit. The conduit is, for example, coupled to an engine, like a combustion engine. Heat that is generated during operational use of the engine is transferred to the heating unit via the liquid and/or gas through the conduit. The heating unit is, for example, a condenser of an air conditioning unit. The heat exchanger is, for example, a cooling unit. The cooling unit is adapted to transfer heat from the airflow to the cooling unit to decrease the temperature of the airflow. The cooling unit, for example, comprises a conduit arranged to provide a flow of liquid and/or gas through the cooling unit. The conduit is, for example, coupled to a heating device adapted transfer heat away from the liquid and/or gas in the conduit to heat a device or a space. In this example, heat from the airflow is used to heat the device or the space. The cooling unit is, for example, the evaporator of an air conditioning unit.

The duct is a hollow structure arranged to guide the airflow to the heat exchanger. For example, one end of the duct is or is connected to the inlet. For example, the other end of the duct is or is connected to the outlet. In another example, the duct is connected to other ducts. In an example, one end of the duct is arranged at the heat exchanger, so the heat exchanger is arranged adjacent to the duct. In another example, the duct extends beyond the heat exchanger, so the heat exchanger is at least partly arranged inside the duct. The duct is, for example, a tube or a pipe with a circular or a rectangular cross-section. The duct is, for example, a straight duct or a duct with one or more bends. Such a bend may be any type of bend that is suitable for the airflow to flow through, such as an angled bend, an offset bend, a U-bend, a circle bend, and an expansion U-bend. The duct may have a part with a small cross-sections and a part with a large cross-section.

The diverging element is a body that is arranged in the duct. The diverging element is adapted to split the airflow into the first airflow part and the second airflow part by separating the first airflow part and the second airflow part from each other. The diverging element splits the airflow into the first airflow part and the second airflow part by providing a local blockade in the duct that locally blocks the airflow. By locally blocking the airflow, the local blockade forces one part of the airflow to flow around one side of the blockade to form the first airflow part, and forces another part of the airflow to flow around another side of the blockade to form the second airflow part. For example, the diverging element has a tubular body, wherein the first flow path is formed through the tubular body, and wherein the second flow path is formed along an outer surface of the tubular body. In another example, the diverging element comprises a plurality of separate bodies arranged in the duct, wherein the bodies are arranged to split the airflow in the first airflow part and the second airflow part. The plurality of separate bodies are, for example, individually attached to the duct and/or to the heat exchanger. In another example, the diverging element comprises a frame, wherein the plurality of separate bodies are attached to the frame. The frame is attached to the duct.

The diverging element is adapted to diverge the first airflow part, the second airflow part or both the first airflow part and the second airflow part. The first airflow part diverges by, for example, increasing the size of the cross-section of the first airflow part along the flow direction along the first flow path. The size of the cross-section is, for example, the surface area of the cross-section. The size of the cross-section is, for example, the diameter, the height or the width of the cross-section of the first airflow part. The second airflow part diverges by, for example, increasing the size of the cross-section of the second airflow part along the flow direction along the second flow path. The size of the cross-section is, for example, the surface area of the cross-section. The size of the cross-section is, for example, the diameter, the height or the width of the cross-section. Because the second airflow path encloses the first flow path, the second airflow part diverges, for example, as follows. At the beginning of the diverging element, the first airflow path has a first cross-section. The second airflow path has a second cross-section enclosing the first cross-section. Further downstream, the second cross-section has increased by expanding towards the first-cross-section. As a result, the first cross-section has been reduced. In this example, the outer dimensions of the second cross-section may remain the same. The second airflow part diverges because the second cross-section expands towards the first cross-section.

The diverging element comprises, for example, one or more angled surfaces adapted to diverge at least one of the first airflow and the second airflow. The angled surface has an angle between 0-90° with the flow direction of the airflow, for example 30° or 45° or 60°. The angled surface is, for example, a straight surface or a curved surface, such as a convex or concave surface. The angled surface is for example cone-shaped or pyramid-shaped.

The second flow path encloses the first flow path completely or partially. In case the second flow path encloses the first flow path completely, the first flow path is completely surrounded by the second flow path in the transverse plane. In this case, the second flow path is in between the wall of the duct and the first flow path all around the first flow path in the transverse plane. In case the second flow path encloses the first flow path partially, the second flow path is in between the wall of the duct and the first flow path at a part of the circumference of the first flow path along the transverse plane, whereas the second flow path is not present between the wall of the duct and the first flow path at another part of the circumference of the first flow path in the transverse plane. In an example, the second flow path partly encloses the first flow path by enclosing the first flow path above and below the first flow path, but not left and right of the first flow path. In another example, the second flow path partly encloses the first flow path by enclosing the first flow path left and right of the first flow path, but not above and below the first flow path. The expressions left, right, above and below are in the transverse plane.

By splitting the airflow into the first airflow part and the second airflow part, and then by diverging the first airflow part and/or the second airflow part, the resulting airflow is much more divided over the transverse plane than in the known heat exchange system. So when the resulting airflow contacts the receiving area of the heat exchanger, the airflow is more evenly divided over the receiving area, resulting in an efficient heat exchange.

In an embodiment the heat exchange system comprises a fan for creating the airflow. The diverging element is arranged between the fan and the heat exchanger.

According to this embodiment, a fan is provided to propel air to create the airflow. The fan is a device that has a rotor that is able to create the airflow. The rotor is for example provided with blades. In another example, the fan is a centrifugal pump for pumping the airflow. The centrifugal pump has a rotor, which is also referred to as impeller. In yet another example, the fan is an axial pump for pumping the airflow. In an example, the fan is a cross-flow fan, which is sometimes referred to as a tangential fan or a tubular fan. The airflow moves transversely across the rotor of the cross-flow fan.

When the fan creates the airflow, typically a jet of air is created, especially when the fan operates at a high speed. In the transverse plane, the air in the center of the jet has a high speed, whereas the air at the edges of the jet has a low speed. Thus, the jet is not an airflow that is evenly divided along the transverse plane. By providing the diverging element between the fan and the heat exchanger, the airflow created by the fan is made more uniform by the time the airflow reaches the heat exchanger. This allows the fan to be operated at a high speed to displace a large amount of air, while the large amount of air is evenly divided over the heat exchange. This provides an efficient transfer of a large amount of heat.

In an embodiment the heat exchange system comprises a plurality of diverging elements. The fan comprises a plurality of outlets to provide a plurality of airflows. Each of the plurality of diverging elements is arranged to receive one of the plurality of airflows respectively.

According to this embodiment, the fan has multiple outlets, and propels air through each of the outlets. As a result, the fan generates multiple airflows. Each of the multiple airflows may be a jet of air, especially when the fan operates at a high speed. To properly distribute the air from all multiple airflows in the transverse direction, multiple diverging elements are provided. Each diverging element is dedicated to one of the outlets and receives the airflow from the dedicated outlet. The diverging element distribute the airflow from their dedicated outlet along the transverse plane. After the multiple airflows pass the diverging elements, the multiple airflows form a single resulting airflow that is received by the receiving surface of the heat exchanger. As a result, the air of the single resulting airflow is properly divided over the receiving surface, allowing an efficient heat transfer with the heat exchanger. In this embodiment, the multiple diverging elements are all the same, or some diverging elements are different from other diverging elements. The design of each diverging element is, for example, individually optimized for the airflow from its dedicated outlet.

In an embodiment, the heat exchanger has a receiving area for receiving the airflow. The receiving area extends along a cross-section of the duct. The diverging element is adapted to distribute the first airflow part and the second airflow part over the receiving area.

The receiving area of the heat exchanger is, for example, formed by one or more surfaces of the heat exchangers. The resulting airflow contacts the one or more surfaces to exchange heat with the heat exchanger. The resulting airflow flows along or around the one or more surfaces to further flow through or around the heat exchanger. The receiving area of the heat exchanger is, for example, formed by a perforated surface. The resulting airflow contacts the perforated surface to exchange heat with the perforated surface. The perforations in the perforated surface allow the resulting airflow to continue flowing through or passed the heat exchanger. The receiving surface is, for example, formed by the ends of a plurality of channels. The resulting airflow is able to enter the channels via the receiving surface. The heat exchanger is, for example, a radiator for a vehicle. The receiving surface is, for example, formed by a plurality of radiator tubes, such as honeycomb radiator tubes. The heat exchanger, is for example, adapted to exchange heat from the receiving surface to a liquid or a gas flowing through the heat exchanger.

In an embodiment, the diverging element is adapted to provide a cross-section of the second flow path that decreases in a direction towards the heat exchanger.

According to this embodiment, the diverging element provides a cross-section for the second flow path that is smaller near the heat exchanger than further upstream away from the heat exchanger. The cross-section is in the transverse plane. For example, the diverging element decreases the cross-section of the second flow path by increasing the inner cross-section surface area. The outer boundary of the cross-section may remain the same, whereas the inner boundary of the cross-section changes. The inner boundary of the cross-sections moves, at least partly, into the direction of the outer boundary to increase the inner cross-section surface area. In case the diverging element also diverges the second airflow part, also the outer boundary of the cross-section moves outward. The outer boundary moves outward a little whereas the inner boundary moves outward a lot, to obtain that the cross-section of the second flow path decreases in the direction of the heat exchanger.

By decreasing the cross-section of the second flow path in the direction towards the heat exchanger, a Venturi-effect is created. The Venturi-effect causes an increase in the flow speed of the second airflow part. Because of the increase in the flow speed of the second airflow part, the flow rate of the second airflow part is increased, whereas the flow rate of the first airflow is decreased. By making use of this Venturi-effect, the flow rates of the first airflow part and the second airflow part can be optimized to obtain an even distribution of the airflow along the transverse plane.

In an embodiment, the diverging element is mechanically connected to the heat exchanger.

According to this embodiment, the diverging element is connected to the heat exchanger by any suitable fastener or hook or clamp etc. For example, the diverging element is connected to a part of the receiving surface. The diverging element has, for example, a connector that is adapted to be inserted in an opening in the receiving surface and that connects the diverging element to the heat exchanger by fixing the connector in the opening. By connecting the diverging element to the heat exchanger, the diverging element and the heat exchanger have an accurately determined position relative to each other. As a result, the airflow through the diverging element is directed properly onto the receiving surface of the heat exchanger. Also, by connecting the diverging element to the heat exchanger, assembling and disassembling the heat exchange system is made easier. Over time, dirt may collect on or in the diverging element and the heat exchanger. In this embodiment, both the diverging element and the heat exchanger can be disassembled from the rest of the heat exchange system by simply removing the heat exchanger. This embodiment also allows to use a simple duct without the need for any mounting means to mount the diverging element.

In an embodiment, the diverging element is adapted to reduce a turbulence of the airflow.

According to this embodiment, the diverging element is adapted to make the airflow less turbulent or to convert the airflow from a turbulent flow to a laminar flow. In a turbulent flow, vortices occur that cause air not only to flow in the flow direction, but also opposite to the flow direction. In case the airflow is a turbulent flow, a large pressure is needed to propel the airflow through the heat exchange system. The less turbulent the resulting airflow is, the less power the fan requires to create the desired flow rate of the airflow. Also, the less turbulent the resulting airflow is, the more evenly the resulting airflow is divided over the receiving surface of the heat exchanger. The diverging element is, for example, adapted to accelerate the first airflow part and/or the second airflow part. The diverging element is able to accelerate the first airflow part by gradually decreasing the cross-section of the first flow path in the transverse plane along the flow direction. The diverging element is able to accelerate the second airflow part by gradually decreasing the cross-section of the second flow path in the transverse plane along the flow direction. Because of this acceleration, the flow speed increases. Due to this acceleration, less vortices are able to create a flow opposite to the flow direction. The flow speed of a vortex opposite to the flow direction becomes smaller than the increasing flow speed in the flow direction. As a result, vortices disappear from the airflow, and thus the airflow becomes less turbulent.

In an embodiment, the diverging element comprises a first hollow body having a first inner surface and a first outer surface. The first inner surface is arranged to guide the first airflow part along the first flow path through the first hollow body. The first outer surface is arranged to guide the second airflow part along the second flow path.

According to this embodiment, the first inner surface provides the outer boundary of the first flow path. The first outer surface provides the inner boundary of the second flow path. The first flow path and the second flow path are separated from each other by the first hollow body. In an example, the first inner surface is arranged at an angle with the flow direction. Because the first inner surface is arranged at the angle with the flow direction, the cross-section in the transverse plane of the first flow path increases along the flow direction, thereby diverging the first airflow part. In case the first outer surface is parallel to the flow direction, the thickness of the first hollow body decreases along the flow direction. In another example, the first outer surface is arranged at an angle with the flow direction. Because the first outer surface is arranged at the angle with the flow direction, the cross-section in the transverse plane of the second flow path increases along the flow direction, thereby diverging the second airflow part. In case the first inner surface is parallel to the flow direction, the thickness of the first hollow body increases along the flow direction. In another example, the first inner surface and the first outer surface are both at an angle with the flow direction. As a result, both the cross-sections in the transverse plane of the first flow path and second flow path increase along the flow direction, thereby diverging the first airflow part and second airflow part. In case both the first inner surface and the second inner surface are at the same angle with the flow direction, the thickness of the first hollow body remains the same along the flow direction. Further, the direction of the airflow is optionally adjusted by placing the first hollow body at a certain position along the cross-section of the duct and/or by placing the first hollow body at an angle relative to the flow direction.

In an embodiment, the diverging element comprises a second hollow body having a second inner surface and a second outer surface. The second hollow body encloses the second flow path. The second hollow body is arranged to split the airflow in a third airflow part along a third flow path. The third flow path encloses the second flow path. The second hollow body is optionally adapted to diverge the third airflow part. The first outer surface and the second inner surface are arranged to guide the second airflow part along the second flow path. The second outer surface is arranged to guide the third airflow part along the third flow path.

According to this embodiment, the second hollow body is arranged around the second flow path to create a third flow path around the second flow path. By providing the second hollow body, three flow paths are created. By dividing the airflow over the three flow paths and by diverging one, two or all three of the first airflow part, the second airflow part and the third airflow part, the even distribution of the airflow along the transverse plane is achieved. Especially in case of a duct with sharp bends, in case only a short length is available along the flow direction to accommodate the diverging element, and/or in case of an airflow at a high speed, providing the second hollow body further improves the distribution of the airflow over the transverse plane. For example, the second hollow body is coaxial with the first hollow body. In another example, the second hollow body is eccentric with the first hollow body. In an example, the second hollow body encloses multiple first hollow bodies, wherein the first hollow bodies are arranged adjacent to each other. Optionally further hollow bodies are arranged that enclose the second hollow body. This way, additional flow paths are created. By adapting the diverging element to create a desired split of the airflow over all the flow paths, and by diverging the airflow parts over the flow paths as desired, a more even distribution of the resulting airflow is obtained, even if the airflow initially is very unevenly distributed over the transverse plane. For example, the diverging element comprises three, four or five hollow bodies.

In an embodiment, the first outer surface and the second inner surface are arranged to provide a cross-section of the second flow path that decreases in a direction towards the heat exchanger.

According to this embodiment, the cross-section of the second flow path decreases along the flow direction. The cross-section is in the transverse plane. As a result of the decreasing cross-section, a Venturi-effect is created. The Venturi-effect causes an acceleration of the second airflow part along the second flow path. The flow speed of the second airflow part increases along the second flow path. Due to the acceleration, the flow rate of the second airflow part along the second flow path increases. By increasing the flow rate of the second airflow, the flow rate of the first airflow part and/or the third airflow part decreases. This way, the resulting airflow is more evenly divided over the transverse plane.

In an embodiment, the second outer surface is arranged relative to a duct wall to provide a cross-section of the third flow path that decreases in a direction towards the heat exchanger.

According to this embodiment, the cross-section of the third flow path decreases along the flow direction. The cross-section is in the transverse plane. As a result of the decreasing cross-section, a Venturi-effect is created. The Venturi-effect causes an acceleration of the third airflow part along the third flow path. The flow speed of the third airflow part is increased along the third flow path. Due to the acceleration, the flow rate of the third airflow part along the third flow path increases. By increasing the flow rate of the third airflow, the flow rate of the first airflow part and/or the second airflow part decreases. This way, the resulting airflow is more evenly divided over the transverse plane.

In an embodiment, at least part of the first hollow body is shaped as a truncated oblique pyramid or a truncated oblique cone.

According to this embodiment, the first hollow body, or at least part thereof, is a pyramid or a cone where the apex is not over the midpoint of its base. Due to various causes, such as bends and appendages in the ducts upstream of the diverging element, the flow profile of the airflow along the transverse plane may be asymmetrical. To convert the asymmetrical airflow into an evenly divided resulting airflow, the inventors have discovered that by setting the oblique apex of a pyramid shape or a cone shape, the diverging element is able to effectively create an evenly divided resulting airflow. Because of the oblique shape, a portion of the first airflow part is guided differently by the diverging element than another portion of the first airflow part. Similarly, because of the oblique shape, a portion of the second airflow part is guided differently by the diverging element than another portion of the second airflow part. Because of this difference between the portions of the first airflow part and the second airflow part, the diverging element is able to create an evenly divided resulting airflow.

In an embodiment the duct comprises a first duct part and a second duct part, both extending in a longitudinal direction. The first duct part is connected to the second duct part to constrain the airflow to guide the airflow to the heat exchanger. The first duct part is configured to be disconnected from the second duct part to provide access to the diverging element and/or heat exchanger by displacing the second duct part in a direction perpendicular to the longitudinal direction.

According to this embodiment, is becomes possible to gain access to the diverging element and/or the heat exchanger by removing the second duct part from the first duct part in a direction perpendicular to the longitudinal direction. The second duct part is removable from the first duct part in a transverse direction. In the example that the duct has a circular cross-section, the second duct part is disconnected from the first duct part and moved in a radial direction away from the first duct part. In an example, the duct has a rectangular cross-section, the second duct part is disconnected from the first duct part and moved in a height-direction or a width-direction away from the first duct part. By providing access to the diverging element and/or the heat exchanger in this way, only a minimum amount of components need to be disassembled in case cleaning or repair of the diverging element and/or the heat exchanger is needed.

The invention further relates to a HVAC-system for a vehicle. The HVAC-system comprises the heat exchange system as described above.

According to an embodiment, a HVAC-system is provided. A HVAC-system is a system that provides heating, ventilation and/or air conditioning (HVAC). Vehicles such as cars, trucks and buses are provided with a HVAC-system to obtain a desired climate in the cabin. The cabin accommodates the driver and optionally passengers, luggage and/or cargo. The HVAC-system is adapted to be operated in a heating mode to heat the cabin. The HVAC-system is adapted to be operated in a cooling mode to cool the cabin. The HVAC-system is for example arranged in the engine bay, in the dashboard or both in the engine bay and the dashboard of the vehicle. Because the space inside the vehicle for the HVAC-system is limited, and because the HVAC-system needs to be arranged between and around other components of the vehicle, the duct is typically short and comprises multiple bends. Because of the short and bent duct, the airflow is very unevenly divided over the transverse plane. By providing the HVAC-system with the heat exchange system according to the invention, the airflow is evenly divided over the heat exchanger. The HVAC-system comprises, for example, a single heat exchanger that is adapted to provide heat to the airflow in the heating mode and to remove heat from the airflow in the cooling mode. In another example, HVAC-system comprises a heat exchanger that is adapted to provide heat to the airflow in the heating mode, and has another heat exchanger that is adapted to remove heat from the airflow in the cooling mode. In another example, the HVAC-system comprises multiple heat exchangers to heat the airflow and/or multiple heat exchangers to cool the airflow. In case the HVAC-system comprises multiple heat exchangers, a single diverging element is provided or multiple diverging elements are provided.

The invention further relates to a vehicle comprising the heat exchange system according to the invention. Optionally, the vehicle comprises the HVAC-system according to the invention.

By providing the vehicle with the heat exchange system, heat between the heat exchanger and the airflow is transferred more efficiently. As a result, less airflow is needed to transfer a desired amount of heat, which allows the use of a smaller fan. In addition or alternatively, the use of a smaller heat exchanger is allowed. By reducing the size of the fan and/or the heat exchanger, spaces becomes available for other components in the vehicle. For example, the vehicle is an electric vehicle comprising an electric motor to propel the vehicle. The electric vehicle is, for example, an electric car such as an electric passenger car. Optionally, the electric vehicle comprises a solar panel and the electric motor, wherein the solar panel is adapted to provide electric power to the electric motor.

In an embodiment, the vehicle comprises a cabin. The heat exchange system is adapted to provide the airflow to the cabin after the airflow has passed the heat exchanger.

According to this embodiment, the temperature of the cabin is controlled by providing the airflow to the cabin. By using the heat exchanger according to the invention, an airflow with a relatively small flow rate is able to transfer a substantial amount of heat to the cabin. As a result, an airflow with only a small flow rate enters the cabin, which improves the comfort for the people in the cabin. An airflow with a small flow rate causes less draft and less noise than an airflow with a large flow rate.

The invention will be described in more detail below under reference to the figures, in which in a non-limiting manner exemplary embodiments of the invention will be shown. The figures show in:

FIG. 1: a heat exchange system according to an embodiment of the invention.

FIG. 2: a schematic cross-section of part of the heat exchange system according to the embodiment of FIG. 1.

FIG. 3: a schematic cross-section of part of the heat exchange system according to a further embodiment.

Figure 1:
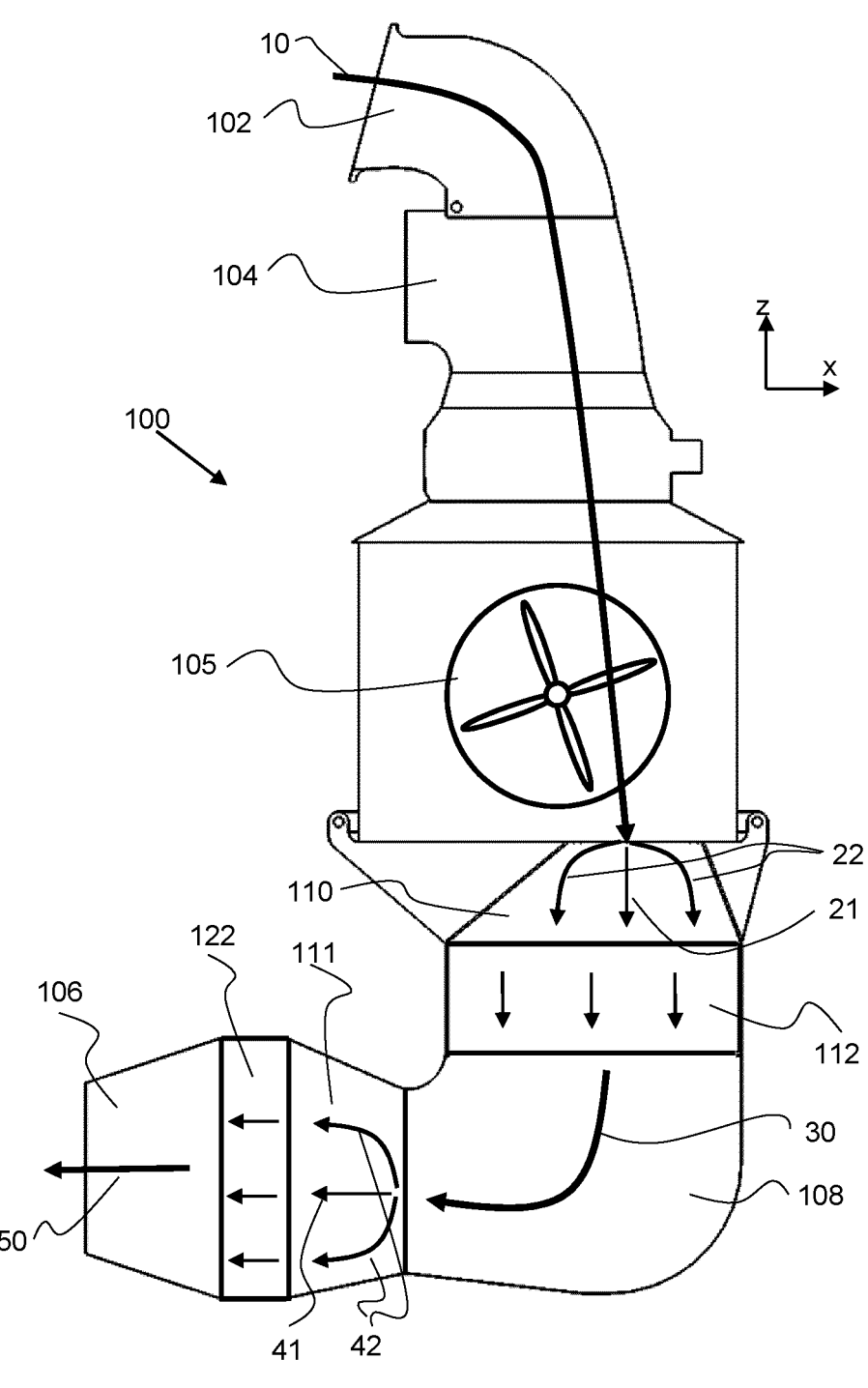

FIG. 1 discloses a heat exchange system 100 according to an embodiment of the invention. The heat exchange system 100 comprises a heat exchanger 112, a duct 104 and a diverging element 110. The duct 104 is connected to an inlet 102 at one side and to an outlet 106 at the other side. A fan 105 is in fluid communication with the duct 104 and is arranged to suck air into the inlet 102. The air sucked into the inlet 102 forms an airflow 10. The duct 104 guides the airflow 10 from the inlet 104 to the fan 105, from the fan 105 to the diverging element 110 and from the diverging element 110 to the heat exchanger 112. To indicate subsequent parts of the airflow 10 at different locations in the heat exchange system 100, reference is made to airflow 10, airflow 30 and airflow 50.

The diverging element 110 is between the fan 105 and the heat exchanger 112. The airflow 10 passes the fan 105 and is directed to the diverging element 110 arranged at an outlet of the fan 105. The fan 105 causes the airflow 10 to be unevenly divided over a transverse plane. The transverse plane is perpendicular to the flow direction of the airflow 10. The diverging element 110 splits the airflow 10 into a first airflow part 21 and a second airflow part 22. Also, the diverging element 110 diverges one or both of the first airflow part 21 and the second airflow part 22. The first airflow part 21 flows along a first flow path, and the second airflow part 22 flows along a second flow path. When the first airflow part 21 and the second airflow part 22 exit the diverging element 110, the first airflow part 21 and the second airflow part 22 are received by the receiving surface of the heat exchanger 112. The receiving surface of the heat exchanger 112 is adjacent to the diverging element 110. The heat exchanger 112 exchanges heat with the first airflow part 21 and the second airflow 22 while the first airflow part 21 and the second airflow part 22 flow through the heat exchanger 112.

Downstream of the heat exchanger 112, the airflow 10 continues as airflow 30. Airflow 30 has a different temperature due to the heat exchange with the heat exchanger 112 than the airflow 10 at the inlet 104. The airflow 30 continues along the duct 104 from the heat exchanger 112 via a bend 108 to a second diverging element 111. The bend 108 in the duct 104 causes the airflow 30 to become unevenly divided over the transverse plane. The second diverging element 111 splits the airflow 30 into a further first airflow part 41 and a further second airflow part 42. Also, the diverging element 111 diverges one or both of the further first airflow part 41 and the further second airflow part 42. The further first airflow part 41 flows along a further first flow path, and the further second airflow part 42 flows along a further second flow path. When the further first airflow part 41 and the further second airflow part 42 exit the further diverging element 111, the further first airflow part 41 and further the second airflow part 42 are received by the receiving surface of the second heat exchanger 122. The receiving surface of the second heat exchanger 122 is adjacent to the further diverging element 111. The further heat exchanger 122 exchanges heat with the further first airflow part 41 and the further second airflow 42 while the further first airflow part 41 and the further second airflow part 42 flow through the second heat exchanger 122. Downstream of the second heat exchanger 122, the airflow 30 continues as airflow 50 through the duct 104 to the outlet 106, where the airflow 50 leaves the heat exchange system 100. Due to heat exchange with the second heat exchanger 111, airflow 50 has a different temperature than the airflow 30.

In an example, the heat exchanger 112 and the further heat exchanger 122 are both adapted to heat respectively the first airflow part 21, the second airflow part 22, the further first airflow part 41 and the further second airflow part 42. In another example, the heat exchanger 112 and the further heat exchanger 122 are both adapted to cool respectively the first airflow part 21, the second airflow part 22, the further first airflow part 41 and the further second airflow part 42. In yet another example the heat exchanger 112 is adapted to heat the first airflow part 21 and the second airflow part 22, whereas the second heat exchanger 122 is adapted to cool the further first airflow part 41 and the further second airflow part 42 or vice versa. In this example, one of the heat exchanger 112 and the second heat exchanger 122 is disabled while the other one of the heat exchanger 112 and the second heat exchanger 122 is operational.

Figure 2:
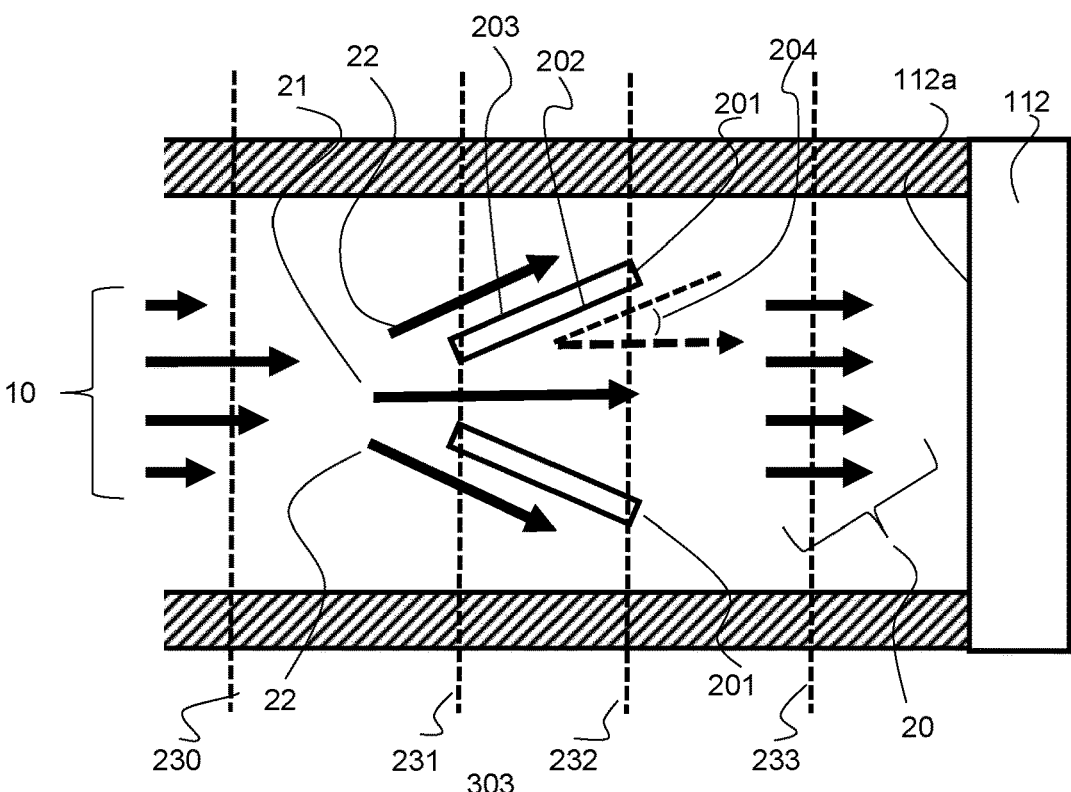

FIG. 2 discloses a schematic cross-section of the heat exchange system 100 according to the embodiment of FIG.

1. The airflow 10 flows into the direction of the diverging element 110 along the flow direction. Due to the jet created by the fan 105, the airflow 10 is unevenly divided over the transverse plane 230. The transverse plane 230 is perpendicular to the flow direction. As shown by the arrows representing the airflow 10 in FIG. 2, the airflow 10 has an uneven flow profile. For example, the airflow 10 is a turbulent airflow comprising vortices. The airflow 10 is split in the first airflow part 21 and the second airflow part 22 by the diverging element 110. The diverging element 110 comprises a first hollow body 201. The first hollow body 201 has a first inner surface 202 and a first outer surface 203. A cross-sectional view of the first hollow body 201 is shown in the figure. The first inner surface 202 forms an opening through the first hollow body 201 to guide the first airflow part 21 through an opening along the first flow path. The first outer surface 203 forms a guide to guide the second airflow part 22 along the first outer surface 203 along the second flow path.

As shown in FIG. 2, the first inner surface 202 and the first outer surface 203 extend at an angle 204 with the flow direction. Because of the angle 204 with the flow direction, the cross-section of the first airflow part 21 at the transverse plane 231 increases along the flow direction to a larger cross-section of the first airflow part 21 at the transverse plane 232 at the end of the diverging element 110. So because of the angle 204 with the flow direction, the first airflow part 21 is diverged by the diverging element 110. Because of the angle 204 with the flow direction, the inner boundary of the cross-section of the second airflow part 22 at the transverse plane 231 moves towards the wall of the duct 204 along the flow direction. As a result, the cross-section of the second flow path at the transverse plane 232 at the end of the diverging element 110 is smaller than the cross-section of the second flow path at the transverse plane 231 at the beginning of the diverging element 110.

Because the diverging element 110 splits the airflow 10 into the first airflow part 21 and the second airflow part 22, and because the diverging element 110 has diverged the first airflow part 21, the resulting airflow 20 has become more evenly distributed over the transverse plane 233 than the airflow 10 was distributed over the transverse plane 230. The resulting airflow 20 is less turbulent than the airflow 10. For example, the resulting airflow 20 has become a laminar airflow. The resulting airflow 20 is then received by the receiving surface 112*a* of the heat exchanger 112. FIG. 2 depicts that the diverging element 110 is arranged at an offset upstream from the heat exchanger 112. In an embodiment, the diverging element 110 is adjacent to the heat exchanger 112.

Figure 3:
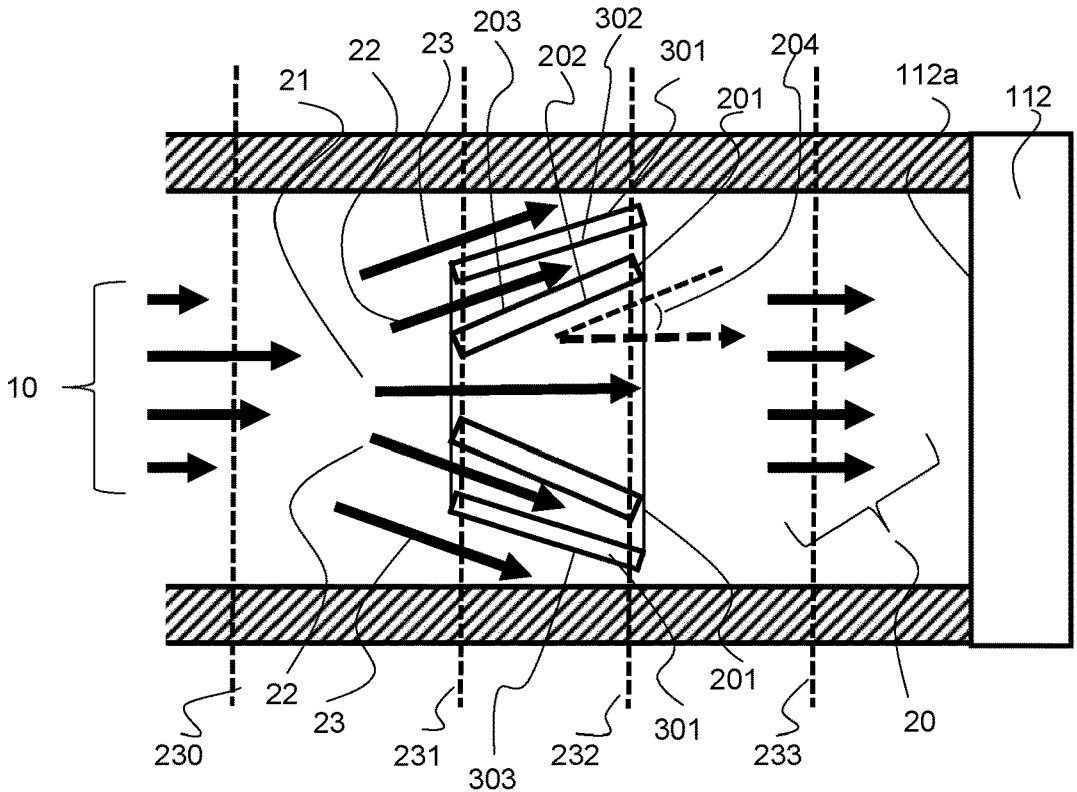

FIG. 3 shows an embodiment similar to the embodiment in FIG. 2 except for the following. The embodiment of FIG. 3 shows that the diverging element 110 has a second hollow body 301. The second hollow body 301 has a second inner surface 302 and a second outer surface 303. The second hollow body 301 encloses the second flow path. The second hollow body 301 is arranged to split the airflow 10 in a third airflow part 23 along a third flow path. The third flow path encloses the second flow path. The second hollow body 301 is adapted to diverge the third airflow part 23. The first outer surface 203 and the second inner surface 302 are arranged to guide the second airflow part 22 along the second flow path. The second outer surface 303 is arranged to guide the third airflow part 23 along the third flow path.

The first outer surface 203 and the second inner surface 302 are arranged to provide a cross-section of the second flow path that decreases in a direction towards the heat exchanger 112, i.e., along the flow direction. The first outer surface 203 is arranged at a slightly larger angle with the flow direction than the second inner surface 302. For example, the difference is 1° or 2° or 5°. As a result of the slight difference in angle, the cross-section along the transverse plane 231 of the second airflow part 22 is larger than the cross-section along the transverse plane 232. Due to the decrease of the cross-section along the flow direction, the Venturi-effect is created. The Venturi-effect causes an increased flow rate of the second airflow part 22.

Further, because of the angle of the second outer surface 303 with the flow direction, the cross-section along the transverse plane 231 of the third airflow part 23 is larger than the cross-section along the transverse plane 232. Due to the decrease of the cross-section along the flow direction, the Venturi-effect is created.

By using the Venturi-effects for the second airflow part 22 and the third airflow part 23, the flow rate of the first airflow part 21, the second airflow part 22 and the third airflow part 23 is set to convert the airflow 10 with an unevenly distributed flow profile to the resulting airflow 20 with a more evenly distributed flow profile. The resulting airflow 20 with the more evenly distributed flow profile is received by the receiving area 112a of the heat exchanger 112. In a similar way, the second diverging element 111 is provided with the first hollow body, or with both the first hollow body and the second hollow body to convert the airflow 30 with an unevenly distributed flow profile to the airflow 50 with a more evenly distributed flow profile.

Figure 4:
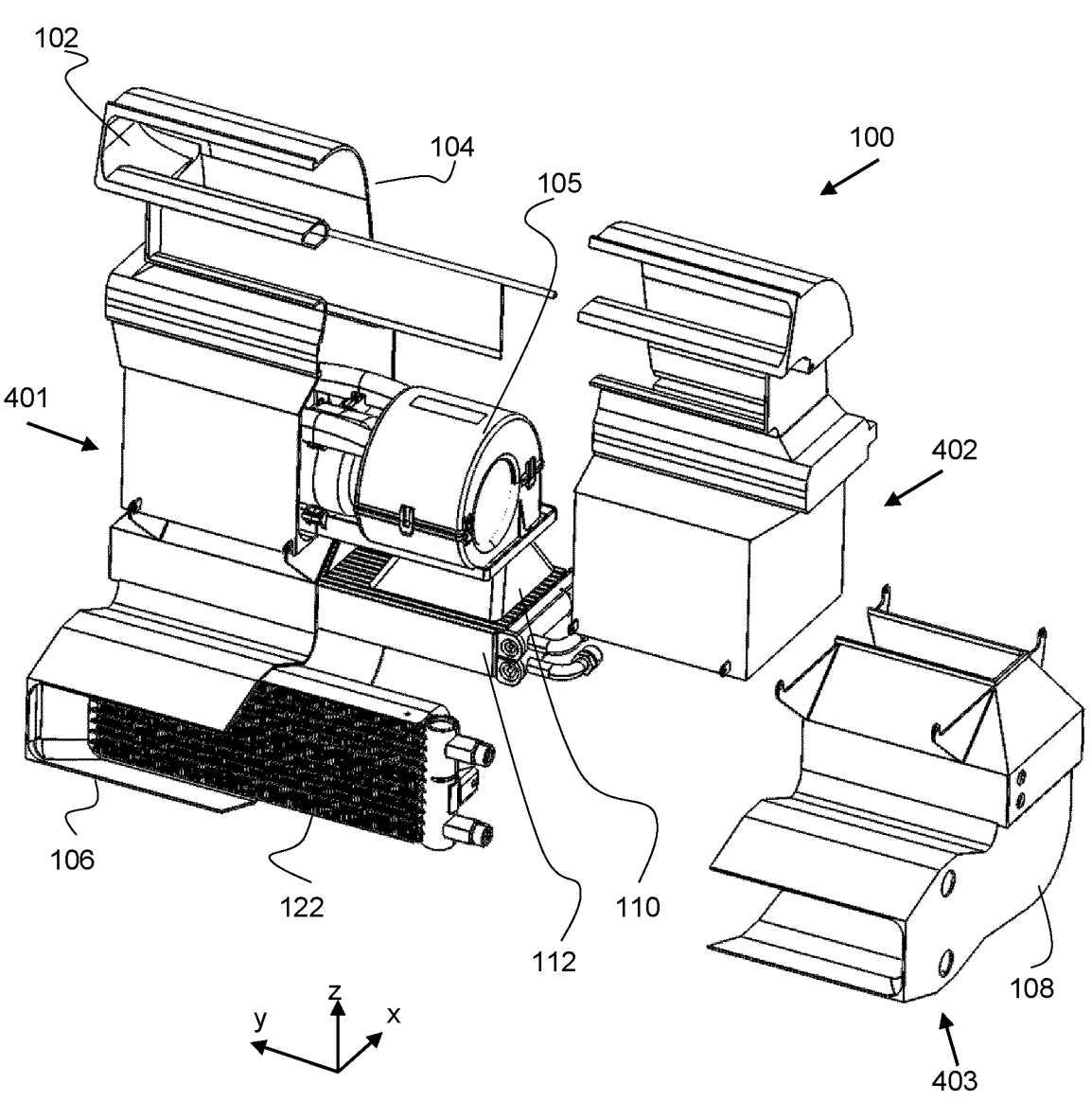
FIG. 4 shows an exploded view of yet another embodiment according to the invention.

FIG. 4 shows an exploded view of yet another embodiment according the invention. An edge of the diverging element 110 is mechanically connected to receiving area 112a of the heat exchanger 112. The duct 104 comprises a first duct part 401, a second duct part 402 and a third duct part 403. The first duct part 401, the second duct part 402 and the third duct part 403 extend in a longitudinal direction of the duct 104, i.e., along the flow direction. The first duct part 401 is connected to the second duct part 402 to constrain the airflow 10 to guide the airflow 10 to the heat exchanger 112. The first duct part 401 is connected to the second duct part 402 to constrain the airflow 10 to guide the airflow 10 from the inlet 102 via the fan 105 to the diverging element 110, and from the diverging element 110 to the heat exchanger 112. The first duct part 401 and the third duct part 403 are connected to each other to guide the airflow 20 from the heat exchanger 112 to the second diverging element 111 and from the second diverging element 111 via the second heat exchanger 122 to the outlet 106. The first duct part 401 is adapted to be disconnected from the second duct part 402 to provide access to the diverging element 110 and heat exchanger 112 by displacing the second duct part 402 in a direction perpendicular to the longitudinal direction. The longitudinal direction of the second duct part 402 is in the z-direction. As shown in FIG. 4, the second duct part 402 is disconnected from the first duct part 401 by moving in the y-direction, which is perpendicular to the flow direction. The first duct part 401 is adapted to be disconnected from the third duct part 403 to provide access to the second diverging element 111 and second heat exchanger 122 by displacing the third duct part 403 in a direction perpendicular to the longitudinal direction. The longitudinal direction of the third duct part 403 is in the z-direction and in the x-direction. As shown in FIG. 4, the third duct part 403 is disconnected from the first duct part 401 by moving in the y-direction, which is perpendicular to the flow direction. In this embodiment, the second duct part 402 and the third duct part 403 are disconnectable from each other. In an alternative embodiment, the second duct part 402 and the third duct part 403 are implemented as a single duct part.

Figure 5:
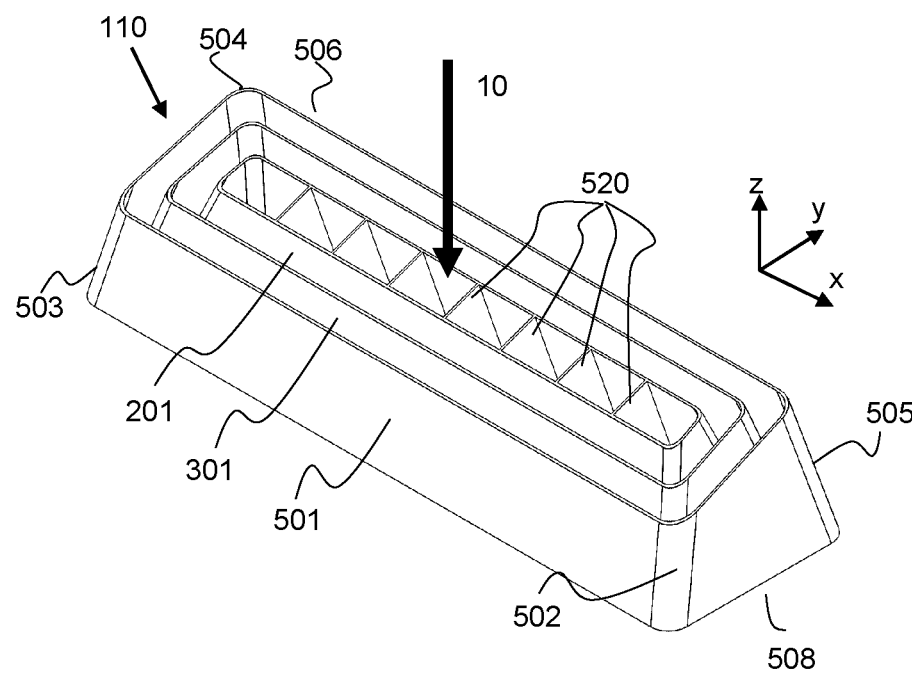
FIG. 5 shows the diverging element according to an embodiment of the invention.

FIG. 5 shows the diverging element 110 according to an embodiment of the invention. The diverging element 110 has a third hollow body 501 enclosing the first hollow body 201 and the second hollow body 301 along the x-direction and the y-direction. The airflow 10 enters the diverging element 110 at the entry plane 506 and exist the diverging element 110 at the exit plane 508. The entry plane 506 is a plane defined by a front surface of the diverging element 110. The exit plane 508 is a plane defined by a back surface of the diverging element 110. The first hollow body 201 comprises bodies 520. Bodies 520 extend perpendicular to the direction of the airflow 10 from the first inner surface 202 at one side of the first hollow body 201 to the first inner surface 202 at another side of the first hollow body 201. The bodies 520 split the first airflow part 21 into multiple airflow parts. The multiple airflow parts are for example parallel to each other. The bodies 520 provide, for example, mechanical strength to the first hollow body 201. The bodies 520 are, for example, arranged to direct the first airflow part 21 along the first flow path. The bodies 520 are, for example, a plurality of channels through the first hollow body 201. The first flow path is through the plurality of channels.

The diverging element 110 has a substantially rectangular exit plane 508 and a substantially rectangular entry plane 506. The exit plane 508 is parallel to the xy-plane in this embodiment. The corners of the diverging elements are formed by ribs 502-505. The ribs 502-505 are rounded with a radius. FIG. 5 shows that ribs 502 and 503 are shorter than ribs 504 and 505. As a result, the exit plane 508 and the entry plane 506 are not parallel to each other. In an embodiment, the ribs 502-505 are not parallel to each other, but directed to a common apex that is upstream of the diverging element 110. This way, the diverging element 110 has the shape of a truncated pyramid. The diverging element 110 is, for example, symmetric along the y-direction. In another example, the x-position of the apex is not at the center of the exit plane 508, but instead at an x-position away from the center of the exit plane 508. In this example, the diverging element 110 is formed as an oblique truncated pyramid.

In another example, the diverging element 110 is adapted as a cone, wherein the entry plane 506 and the exit plane 508 are circular shaped. The cross-section of the entry plane 506 is smaller than the cross-section of the exit plane 508. In case the entry plane 506 is eccentric with the exit plane 508 along the z-axis, the diverging element 110 is an oblique truncated cone. In a further example, each of ribs 502-505 has a length different from the other ribs 502-505.

Figure 6:
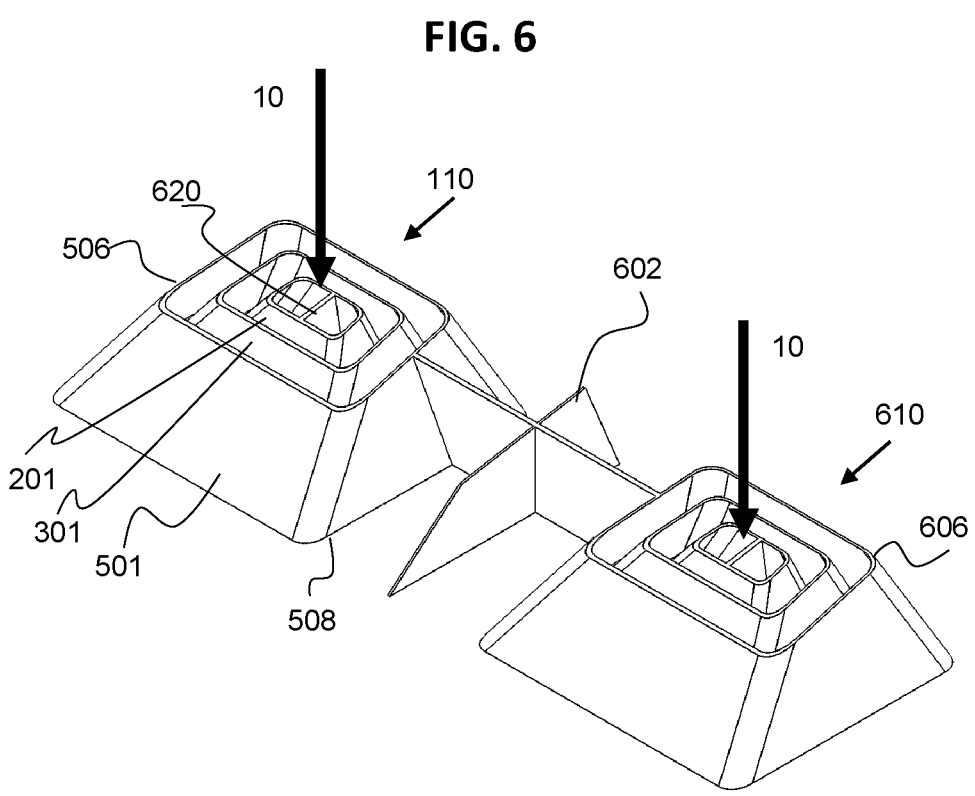
FIG. 6 shows the diverging element according to another embodiment of the invention.

FIG. 6 shows another embodiment of the invention. FIG. 6 shows the diverging element 110 according to any of the embodiments mentioned above. The diverging element 110 is connected to a further diverging element 610 via a connector body 602. The connector body 602 holds the diverging element 110 and the further diverging element 610 at an offset from each other. In an example, the connector body 602 is adapted to be connected to the receiving surface 112a of the heat exchanger 112 or to the duct 104. The further diverging element 610 may be according to any of the embodiments of the diverging element 110 as disclosed above.

This embodiment may be used in combination with a fan 105 that has two outlets through which the fan 150 provides the airflow 10. The entry plane 506 of the diverging element 110 faces one of the outlets, whereas the entry plane 606 of the further diverging element 610 faces the other of the outlets. In an example, there is no airflow at the connector body 602. In this example, all airflow is directed through the third hollow body 501 of the diverging element 110 and the third body of the further diverging element 610. Further connection means are, for example, provided to connect the first hollow body 201, the second hollow body 301 and the third hollow body 501 to each other.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A heat exchange system, comprising:
a heat exchanger;
a duct;
a diverging element,
wherein the duct is adapted to guide an airflow to the heat exchanger,
wherein the diverging element is arranged in the duct,
wherein the diverging element is adapted to split the airflow into a first airflow part along a first flow path and a second airflow part along a second flow path,
wherein the diverging element is adapted to diverge at least one of the first airflow part and the second airflow part,
wherein the second flow path encloses the first flow path,
wherein the heat exchange system comprises a fan for creating the airflow,
wherein the diverging element is arranged between the fan and the heat exchanger,
wherein the diverging element is adapted to provide a cross-section of the second flow path that decreases in a direction towards the heat exchanger,
wherein the heat exchange system comprises a plurality of diverging elements,
wherein the fan comprises a plurality of outlets to provide a plurality of airflows,
wherein each of the plurality of diverging elements is arranged to receive one of the plurality of airflows respectively.

2. The heat exchange system according to claim 1, wherein the heat exchanger has a receiving area for receiving the airflow, wherein the receiving area extends along a cross-section of the duct, wherein the diverging element is adapted to distribute the first airflow part and the second airflow part over the receiving area.

3. The heat exchange system according to claim 1, wherein the diverging element is mechanically connected to the heat exchanger.

4. The heat exchange system according to claim 1, wherein the diverging element is adapted to reduce a turbulence of the airflow.

5. The heat exchange system according to claim 1, wherein the diverging element comprises a first hollow body having a first inner surface and a first outer surface, wherein the first inner surface is arranged to guide the first airflow part along the first flow path through the first hollow body, and wherein the first outer surface is arranged to guide the second airflow part along the second flow path.

6. The heat exchange system according to claim 5, wherein the diverging element comprises a second hollow body having a second inner surface and a second outer surface, wherein the second hollow body encloses the second flow path, wherein the second hollow body is arranged to split the airflow in a third airflow part along a third flow path, wherein the third flow path encloses the second flow path, wherein the second hollow body is adapted to diverge the third airflow part, wherein the first outer surface and the second inner surface are arranged to guide the second airflow part along the second flow path, and wherein the second outer surface is arranged to guide the third airflow part along the third flow path.

7. The heat exchange system according to claim 6, wherein the first outer surface and the second inner surface are arranged to provide a cross-section of the second flow path that decreases in a direction towards the heat exchanger.

8. The heat exchange system according to claim 6, wherein the second outer surface is arranged relative to a duct wall to provide a cross-section of the third flow path that decreases in a direction towards the heat exchanger.

9. The heat exchange system according to claim 5, wherein at least part of the first hollow body is shaped as a truncated oblique pyramid or a truncated oblique cone.

10. The heat exchange system according to claim 1, wherein the duct comprises a first duct part and a second duct part, both extending in a longitudinal direction, wherein the first duct part is connected to the second duct part to constrain the airflow to guide the airflow to the heat exchanger, wherein the first duct part is adapted to be disconnected from the second duct part to provide access to the diverging element and/or heat exchanger by displacing the second duct part in a direction perpendicular to the longitudinal direction.

11. An HVAC-system for a vehicle, comprising the heat exchange system according to claim 1.

12. A vehicle comprising the heat exchange system according to claim 1.

13. The vehicle according to claim 12, comprising a cabin, wherein the heat exchange system is adapted to provide the airflow to the cabin after the airflow has passed the heat exchanger.

* * * * *